United States Patent [19]

Graef et al.

[11] Patent Number: 4,884,679

[45] Date of Patent: Dec. 5, 1989

[54] SECURE TRANSPORT CONSTRUCTION FOR BANKING DEPOSITORY DEVICES

[75] Inventors: Harry T. Graef, Massillon; Kevin H. Newton, North Canton, both of Ohio

[73] Assignee: Diebold Incorporated, North Canton, Ohio

[21] Appl. No.: 597,230

[22] Filed: Apr. 5, 1984

[51] Int. Cl.$^4$ .............................................. B65G 19/00

[52] U.S. Cl. ...................................... 198/718; 109/55; 198/725; 271/272

[58] Field of Search ............... 271/272, 273, 274, 275, 271/110, 111, 265, 3, 4, 235, 245; 198/718, 725, 735, 634; 194/4 C, DIG. 26

[56] References Cited

U.S. PATENT DOCUMENTS

| | | | |
|---|---|---|---|
| 3,648,823 | 3/1972 | Neer | 198/160 |
| 4,312,277 | 1/1982 | Graef et al. | 109/24.1 |
| 4,314,696 | 2/1982 | Graef | 271/275 |

FOREIGN PATENT DOCUMENTS

| | | | |
|---|---|---|---|
| 0052840 | 4/1980 | Japan | 271/274 |

*Primary Examiner*—Joseph J. Rolla

*Attorney, Agent, or Firm*—D. Peter Hochberg; Mark M. Kusner; Louis J. Weisz

[57] ABSTRACT

A depository for receiving under conditions of security bank transaction deposits in envelopes of carying thicknesses one at a time, wherein the envelopes may contain coin in different sizes and numbers. The depository has a transport mechanism including a fixed upper platen, an endless belt having a lower flight movable below and supported by the fixed upper platen, and a lower platen movable with respect to the fixed upper platen at an angle downward from the belt and in the direction of belt travel when the belt is driven. An envelope being conveyed is pinched between the belt and a narrow longitudinal central ribbed plastic rail projecting upward from the movable lower platen. The plastic rail ribs have slippery low friction surfaces and the belt engages a low friction slippery surface portion of the fixed upper platen. Recesses are located on the platens laterally of the belt and ribbed rail extending longitudinally of the platens at either side of the belt and rail to minimize contact with and drag on envelopes being conveyed.

19 Claims, 9 Drawing Sheets

SECURE TRANSPORT CONSTRUCTION FOR BANKING DEPOSITORY DEVICES

CROSS-REFERENCE TO RELATED PATENTS

The secure transport construction for depositories is an improvement on the devices shown and described in U.S. Pat. Nos. 4,312,277 and 4,314,696, owned by the Assignee of this application.

BACKGROUND OF THE INVENTION

1. Field of the Invention

The invention relates to depository devices for receiving, under most secure conditions, customer's deposits of banking transaction materials in banking unit devices comprising or forming a part of automatic banking equipment (ATMs) located in banking institution buildings normally unattended and available day and night, or situated at unattended remote locations.

More particularly, the invention relates to a secure transport mechanism for such depositories which has a simplified construction accepting under most secure conditions deposits of varying thicknesses in envelopes frequently containing coin in varying sizes and numbers, and sometimes deposit material in wet envelopes.

Further, the invention relates to secure depository transport mechanism which has lower drag characteristics than prior depository transports, and thus has less motor torque drive requirements, thereby providing for economical and reliable acceptance of bank deposits irrespective of varying sizes, shapes and conditions of the deposited material.

Finally, the invention relates to depository equipment having the new security and deposit handling features described, along with the favorable and omitting unfavorable mechanism characteristics for handling deposits disclosed in U.S. Pat. No.4,312,277.

2. Description of the Prior Art

Numerous depository devices for accepting banking deposits are known in the art, particularly equipment designed to receive banking material in envelopes.

One prior envelope depository is shown and described in U.S. Pat. No. 4,312,277. This device uses a belt assembly transport mechanism to convey the deposit envelope from an entry slot along a path of travel on a fixed lower flat plate platen to a deposit-receiving container. The transport assembly includes an endless belt trained around spaced rolls, one of which is driven, mounted on a vertically floating upper flat plate platen. One flight of the endless belt when driven moves in a direction of travel between the fixed lower and floating upper flat plate platens with the upper floating platen pressing said belt flight and an envelope being deposited against the fixed lower platen to convey the envelope to the container.

This prior transport mechanism, due to the movement up and down of the belt assembly on the upper platen to accommodate different envelope thicknesses, involves difficulties in providing power to one of the belt assembly rolls to drive the belt between the platens under vertical pressure. There is a further collateral difficulty of heavy drag occurring between the belt and envelope pressed between the flat plate platens during conveying movement.

Another prior transport mechanism for bank notes is shown and described in U.S. Pat. No. 4,314,696. This device has two flat plate platens in fixed positions with clearance therebetween to accommodate the endless belt movement of bank notes, one at a time, between the fixed platens and along the lower platen during which movement the belt and bank notes are pressed by the upper platen against the lower platen. The construction of this belt transport has reduced drag since the platen surfaces engaged by the belt are coated with material having low friction characteristics. However, this prior transport construction, which only conveys thin bank notes one at a time, cannot accept or convey envelopes containing different thicknesses of banking materials to be deposited and, more particularly, cannot convey envelopes containing coin.

Prior art conveying equipment is known as shown in U.S. Pat. No. 3,648,823 which conveys cans being labeled that roll along a path of travel engaged by a moving endless belt. The equipment is adjustable to accommodate cans of different diameters. However, only one can diameter can be accommodated during any fixed adjustment of the mechanism. There is nothing in this prior art conveying mechanism which provides transport means under conditions of security for conveying material to be deposited in envelopes having different thicknesses and particularly envelopes containing coin.

There are no provisions in the prior art, of which we are aware, for maximum security in handling and delivering banking material deposited in envelopes into automatic banking depository equipment units which can accept deposits of banking material in envelopes having varying thicknesses from envelope to envelope, frequently containing coin in varying sizes and numbers and frequently in wet envelopes; wherein the envelopes are conveyed by belt transport mechanism of simplified construction having low power drive requirements, and minimum drag characteristics; and wherein the transport mechanism avoids the described problems, difficulties and deficiencies present in prior art envelope depositories.

Thus, there exists a need in the field of unattended depository banking service and equipment for envelope depository transport mechanism which accepts and deposits envelopes of varying thicknesses from envelope to envelope under maximum security conditions and which has a simple construction and is reliable and effective in operation.

SUMMARY OF THE INVENTION

Objectives of the invention include providing an improved envelope transport mechanism for an envelope depository device used in unattended banking system equipment. The system utilizes a simple construction including separable fixed and movable platens, between which moves one flight of a driven endless rubber belt. Deposit-material-containing envelopes of varying thicknesses from envelope to envelope are accepted at the entry end of the transport mechanism. Each such envelope when engaged with the driven belt at the transport entry is conveyed by said belt along a path of travel between the platens. The movable platen is pushed away from the fixed platen by envelope movment causing the platens to separate and moving the movable platen away from the fixed upper platen at an angle and in the direction of belt travel to the degree necessary to accommodate the thickness of the particular envelope and contents being conveyed. Such transport mechanism will accept and convey envelopes containing coin in various amounts and sizes, as well as wet envelopes containing material to be deposited. It is a further object of the invention to provide such a transport mechanism having low drag characteristics between the envelope and platens between which the belt and envelope together slide as the envelope is conveyed along the transport mechanism path of travel. Providing a transport mechanism for which less motor drive torque is required for driving the transport mechanism than heretofore required in the operation of prior art envelope depositories is a further aim of the invention.

It is a further object of the present invention to enhance the security under which deposit containing envelopes are received by providing a mechanism with a gate member pivotally mounted intermediate its ends on the mechanism frame which encompasses the belt and platen assembly and has end barrier plates blocking access through the belt and platen assembly at all times by one or the other of said barrier end plates. The gate member incorporates a probe extending from the exit barrier plate for sensing whether a container, into which deposit envelopes are discharged from the transport mechanism, is full and cannot receive further envelopes.

Providing a transport mechanism in which the various described features are combined in cooperative relation to achieve the stated objectives in an efficient and secure manner eliminates prior art envelope depository mechanism problems and satisfies needs existing in the field of automatic envelope depository banking services.

Such objectives are obtained by a secure depository construction for banking depository devices of the type described herein. In devices incorporating the present invention envelopes containing material of varying thicknesses to be deposited are conveyed by a belt transport mechanism along a path of travel extending between transport entry and discharge ends. The transport is mounted in a frame and has relatively separable platens one of which is mounted in fixed position on said frame and the other of which is movable vertically away from the fixed platen. The transport has an endless belt trained around spaced rolls one of which is driven. The lower flight of said belt extends between said platens and when driven moves along said path of travel in a direction from said transport entry end toward said discharge end. A gate member is pivotally mounted intermediate its ends on said frame and has a barrier plate at each end so that throughaccess between the platens along the transport path of travel is blocked at all times by one or the other of said barrier plates. As an envelope is conveyed one or the other of said barrier plates is located ahead of or behind an envelope along said path of travel thus preventing through access. The foregoing objectives are accomplished by an envelope transport mechanism comprising: a fixed platen mounted on said frame; an endless belt trained around spaced rolls journaled in fixed positions on said fixed platen, one of which rolls is driven; the belt having one flight movable along, and in supporting contact with said fixed platen; a movable platen separable from said fixed platen; means mounting the movable platen on said frame for movement angularly away from said fixed platen and in the direction of travel of said one belt flight when the belt is driven; and said movable platen being spring biased normally toward said fixed platen to engage said one belt flight; whereby envelopes containing banking material to be deposited of varying thicknesses, when any such envelope is engaged with the belt at the entry end of said transport mechanism, such envelope is conveyed by said belt along the path of travel between said platens, and the movable platen is sprung away from the fixed platen by such envelope to separate the platens to the degree necessary to accommodate the thickness of banking material contained in such envelope.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

Similar numerals refer to similar parts throughout the various figures of the drawings.

DESCRIPTION OF THE PREFERRED EMBODIMENT

Figure 1:
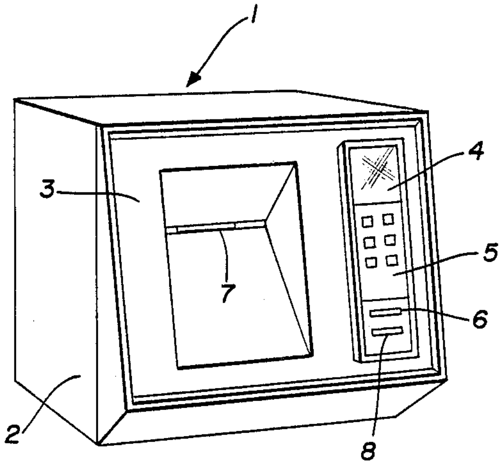
FIG. 1 is a diagrammatic perspective view of an automatic banking depository unit equipped with the improved envelope depository device.

An unmanned automatic banking unit equipped with the improved envelope depository transport mechanism for conveying varying thickness envelopes is indicated generally at 1 in FIG. 1. The unit 1 may comprise merely a depository having a housing 2 and a face plate or fascia 3 containing an instruction panel 4 for displaying instructions for use of the depository unit 1. A keyboard 5 mounted on plate 3 may be used to actuate operation of the depository 1, which also may have a card entry slot 6 for insertion of a personalized conventional magnetic-stripe plastic coated card for initiating a transaction and for identifying the customer making a deposit of an envelope at the unmanned depository.

The face plate 3 also may be provided with an envelope entry slot 7 through which deposit envelopes containing deposit material including coin are entered into the unit 1. Finally, the face plate 3 may be equipped in a usual manner with a receipt slot 8 where a receipt for a transaction may be delivered to the customer at the completion of the depositing operation.

Although the invention is illustrated and described with respect to a depository unit 1 for accepting banking transaction deposits at unmanned locations, the improved depository device may form part of a typical automatic cash dispenser (ATM) such as disclosed in U.S. Pat. No. 4,154,437.

Figure 3:
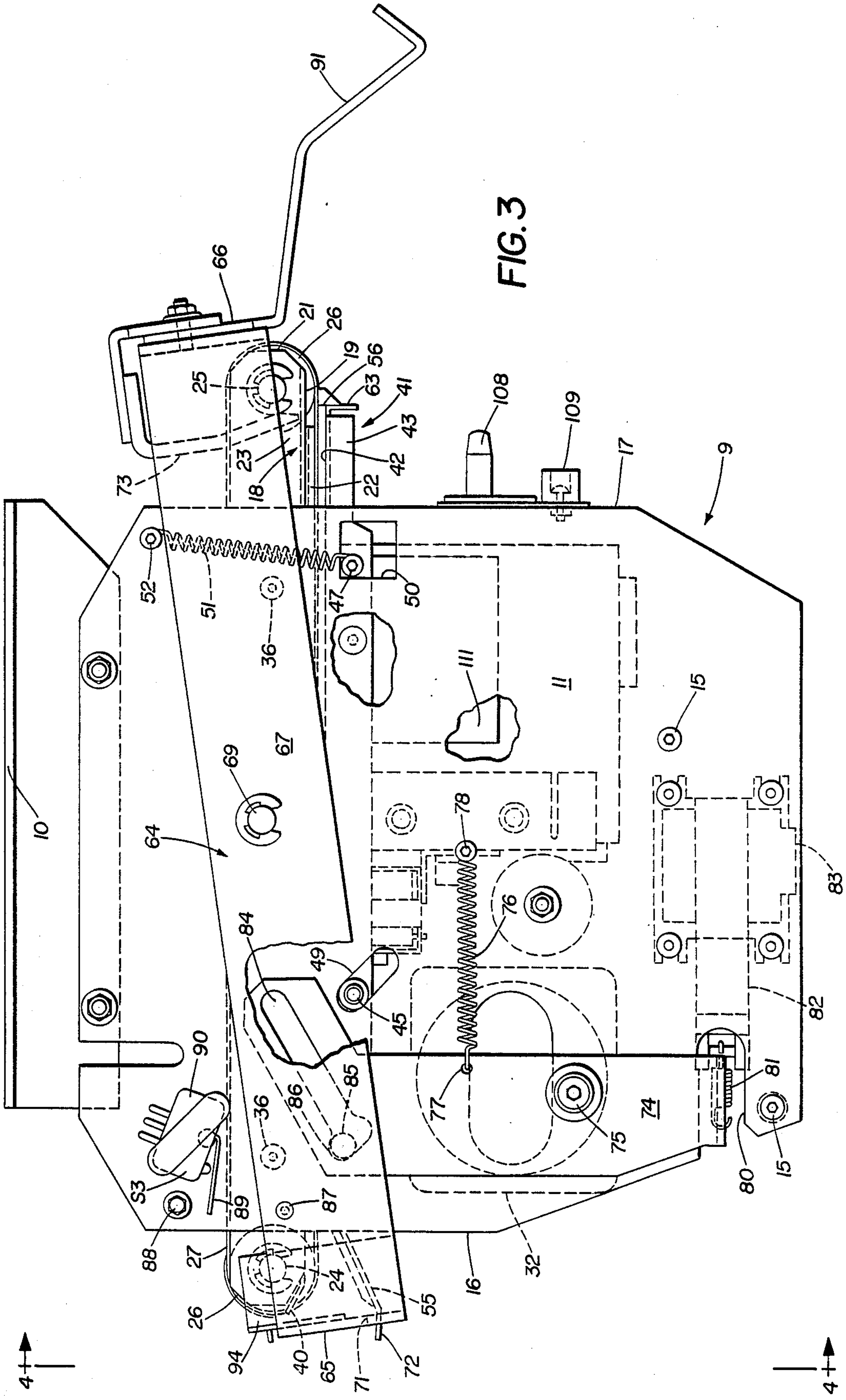
FIG. 3 is a side view of the new transport mechanism shown in FIG. 2.
Figure 10:
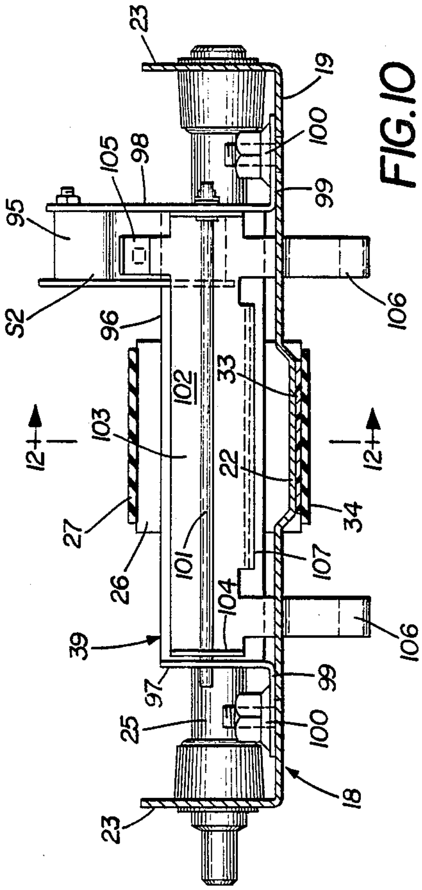
FIG. 10 is a sectional view looking in the direction of the arrows 10—10, FIG. 8 illustrating the construction of the fixed upper platen component.

The improved envelope transport mechanism assembly components of the invention, generally indicated at 9 and shown, for example, in FIG. 3, are mounted in the depository unit 1 within the housing 2 by bolting flanges 10 attached to the side members 11 of the unit 9 to stringer frame members 12 of the depository unit 1. The stringer members 12 are spaced apart and held in fixed position in the depository unit 1 and, thus, hold the platelike side members 11 in fixed spaced positions hanging from the stringer members 12.

The lower portions of the side plates 11 similarly are held in fixed spaced positions by spacer rods 13 and 14 the ends of which are secured to the plates 11 by bolts 15 the heads of which have hexagon tool-receiving recesses as shown (FIG. 3).

Figure 4:
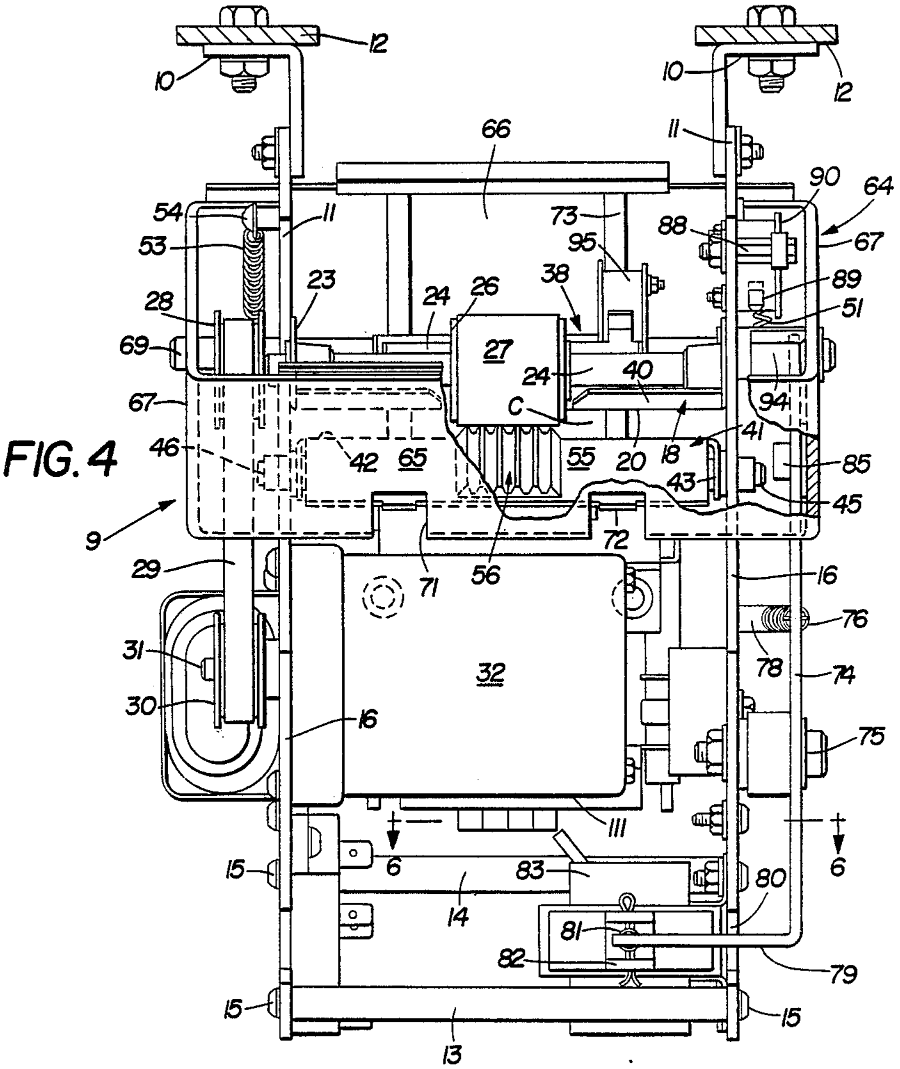
FIG. 4 is an end view of the new transport mechanism shown in FIGS. 2 and 3 looking in the direction of the arrows 4—4, FIG. 3.
Figure 2:
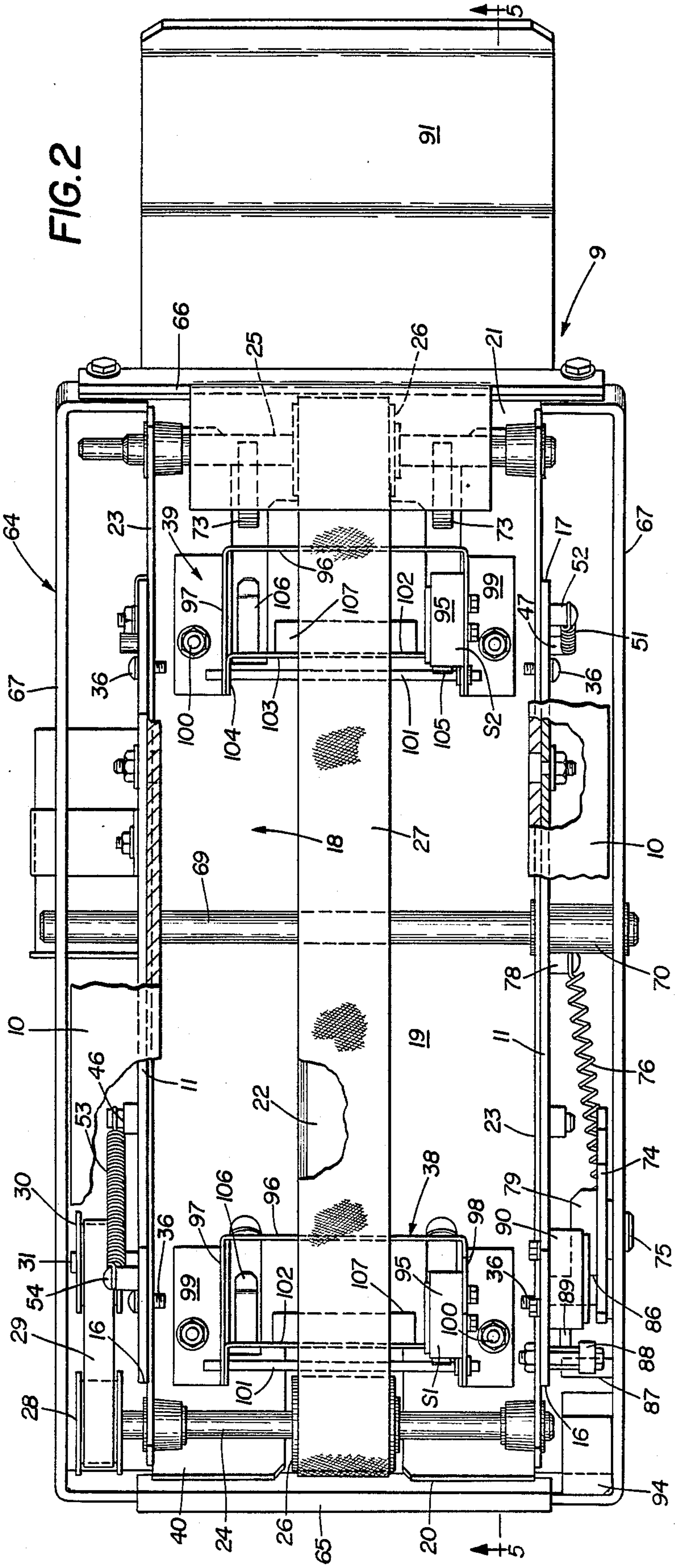
FIG. 2 is a top plan view of the new transport mechanism of the invention, per se, detached from other components of the depository.

In this manner the side plates 11 of the mechanism 9, held in fixed spaced positions by the stringers 12 and spacer rods 13 and 14 provide a through passage from the entry end edges 16 to the discharge end edges 17 of the side plates 11 (FIGS. 2 and 4).

The transport mechanism assembly 9 has a fixed upper platen component, generally indicated at 18, located in the through passage between the side plates 11 mounted on and extending between the side plates 11 at the top portions thereof. The fixed platen 18 is shown detached from the mechanism in FIG. 8.

Platen 18 has a bottom wall 19 extending from the entry end 20 to the discharge end 21 of the platen 18. A longitudinally extending offset belt-supporting portion 22 is formed in the platen bottom wall 19 projecting downward. Bottom wall 19 terminates laterally in upturned mounting flanges 23. Entry and discharge roll shafts 24 and 25 are journaled at their ends in end portions of the upturned mounting flanges 23. Shafts 24 and 25 have centrally disposed rolls 26 around which an endless rubber belt 27 is trained. One end of roll shaft 24 is provided with a pulley 28 driven by a belt 29 (FIG. 2) engaging pulley 30 on the drive shaft 31 of drive motor 32 (FIG. 4).

A low-friction plastic material strip 33 is located on the bottom surface of the platen offset bottom wall portion 22 which provides a slippery belt-supporting surface on the offset portion 22 on which the lower reach 34 of the belt 27 slides as the belt is driven along the plastic strip 33 by the drive motor 32 in the direction of the arrow 35 from the entry end to the discharge end of the fixed upper platen 18.

The platen 18 is mounted in fixed position on and between the side plates 11 by bolts 36 extending through openings 37 formed in the mounting flanges 23 of the fixed upper platen 18.

Preferably similar envelope entry and discharge sensor devices generally indicated at 38 and 39 are mounted on the fixed upper platen 18 for purposes described below.

The entry end of the platen bottom wall 19 at either side of the central offset portion 22 has an angularly upturned ramp formation 40 adjacent either edge of the belt 27 where the belt engages the entry roll 26.

Figures 8, 9:
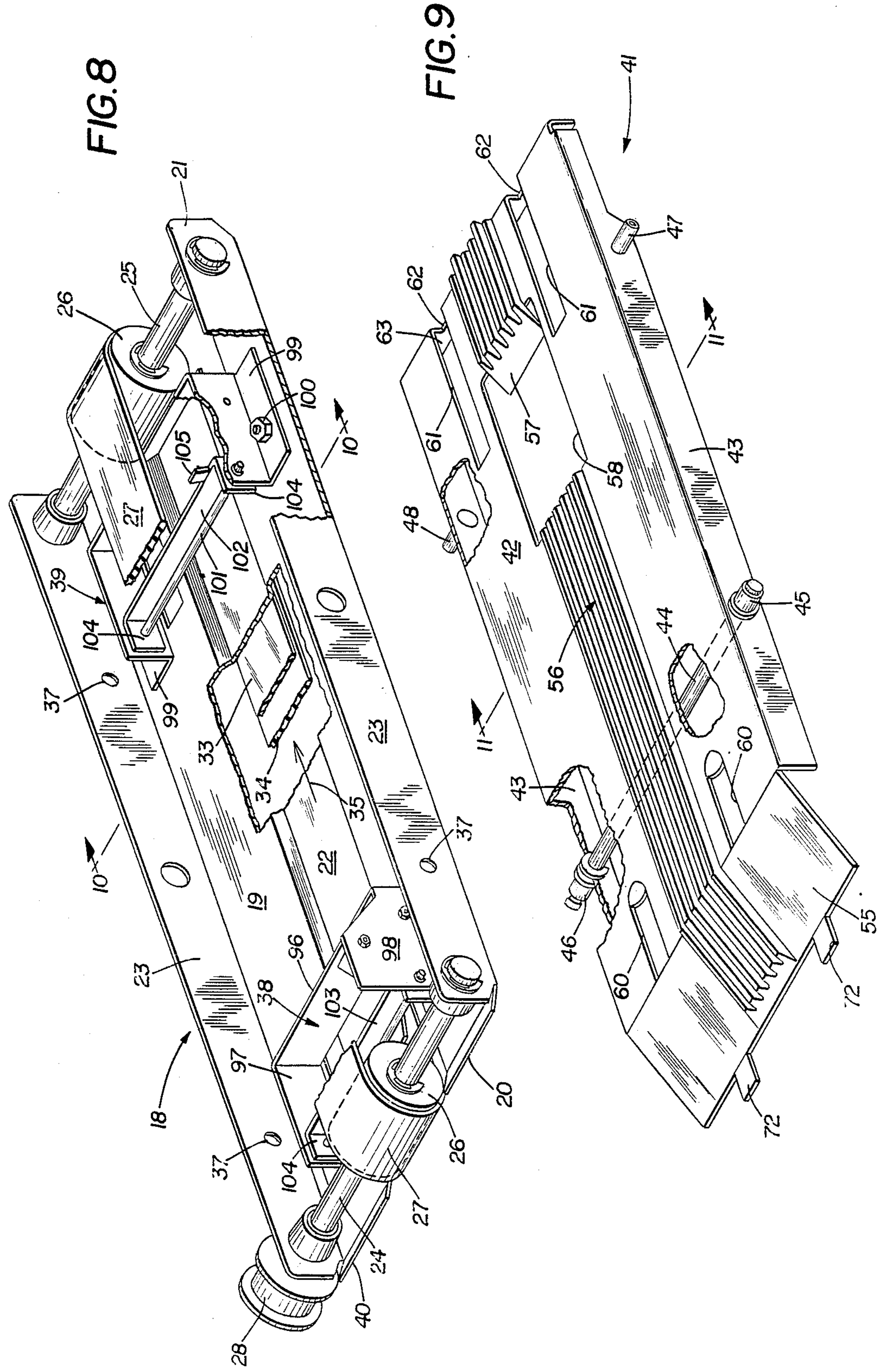
FIG. 8 is a perspective view of the fixed upper platen component of the transport mechanism detached from the mechanism shown in FIGS. 2, 3 and 4.
FIG. 9 is a perspective view similar to FIG. 8 of the movable lower platen component of the transport mechanism detached from the mechanism shown in FIGS. 2,3 and 4.

A movable platen generally indicated at 41, best shown in FIG. 9, is located between the side plates 11 and is movably mounted thereon. The platen 41 is channel shaped in cross section and has a flat top wall 42 and downturned side flanges 43. A shaft 44 is mounted beneath the top wall 42 on and extending between the side flanges 43 adjacent the entry end of the platen 41. The shaft 44 has end pins 45 and 46 projecting outward from the flanges 43. At the discharge end of the platen 41, pins 47 and 48 are mounted on and project outward from the flanges 43.

The pins 45 and 46 extend into and through and are guided by angular slots 49 formed in the side plates 11. The pins 47 and 48 extend through enlarged, preferably square, openings 50 formed in the side plate 11 adjacent the discharge end edges 17 of the side plates 11. In this manner the lower platen 41 is movably mounted on the transport assembly 9 and is relatively movable with respect to the fixed upper platen 18.

A spring 51 has one end attached at 52 to one of the side plates 11 (FIG. 3) and its other end is attached to platen pin 47 at the discharge end of the transport assembly 9. A spring 53 (FIGS. 2 and 4) is attached to the other side plate 11 at 54 and to pin 46 adjacent the entry of the transport assembly 9.

Springs 51 and 53 serve as biasing means. The tension of the springs 51 and 53 normally biases the movable lower platen 41 into contact with the upper platen 18. Spring 53 pulls platen 41 upward and toward fixed platen 18 at the entry end of the transport assembly 9, while spring 51 pulls the discharge end of platen 41 upward against fixed platen 18.

Figures 16, 17, 18:
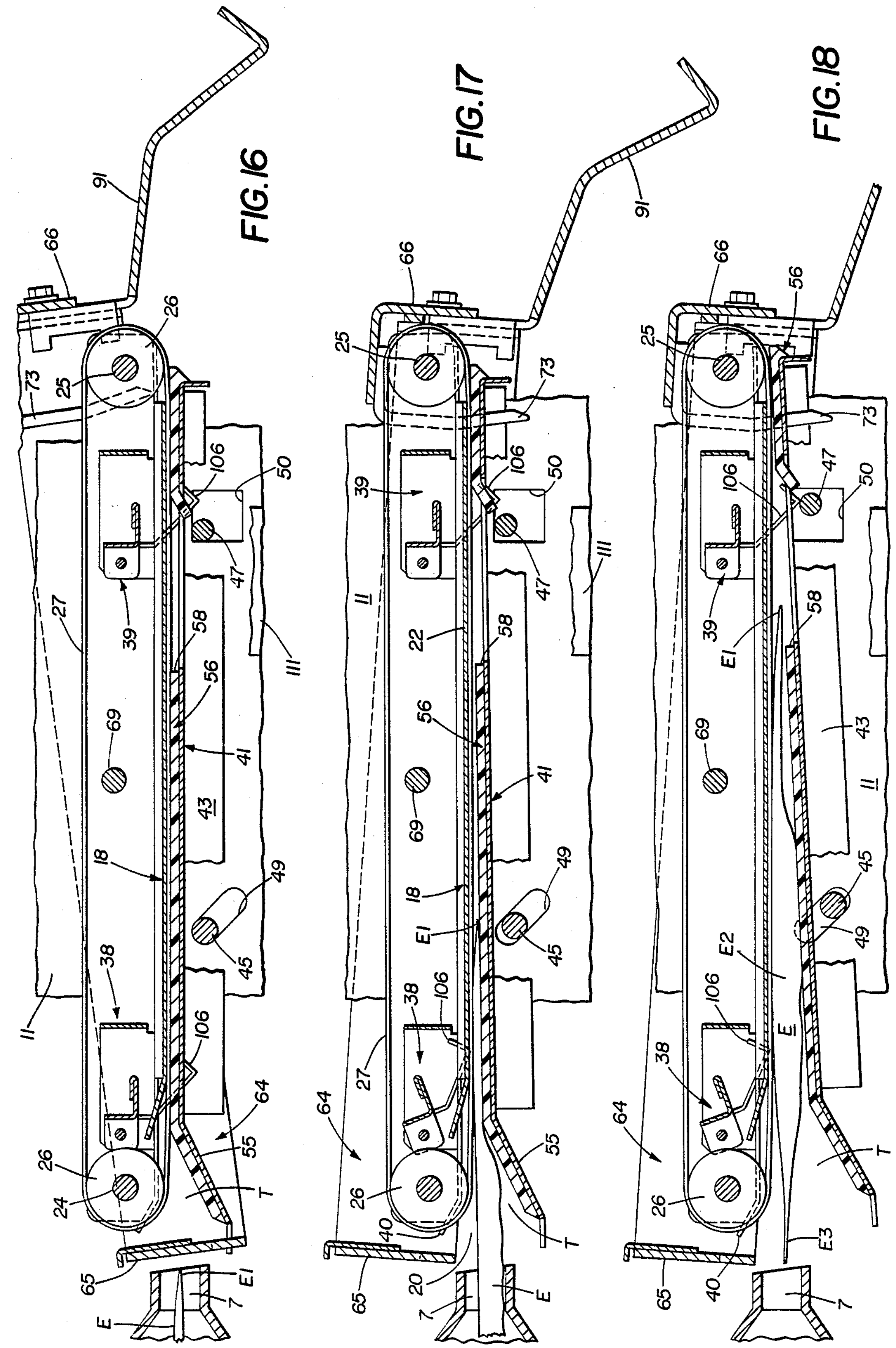
FIG. 16 is a somewhat diagrammatic view illustrating the transport mechanism in normal closed position with the gate front end barrier plate blocking access to the transport mechanism.
FIG. 17 is a view similar to FIG. 16 showing the gate moved to open position with the gate rear end barrier plate blocking movement of an envelope from the discharge end of the transport mechanism, and the gate front end barrier plate raised to permit an envelope to be entered into and accepted by the transport mechanism, as shown.
FIG. 18 is a view similar to FIGS. 16 and 17 showing an envelope with a thick portion conveyed most of the way into the transport mechanism, and showing the lower platen depressed or sprung away from the upper platen by the thicker portion of the envelope being conveyed.
Figure 19:
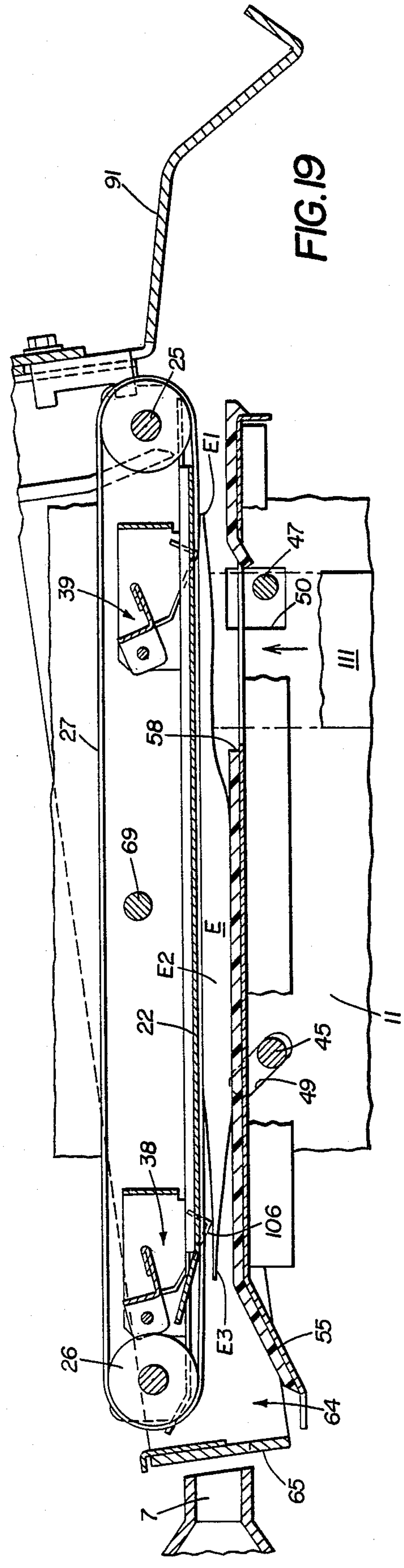
FIG. 19 is a view similar to FIGS. 16 through 18 but showing the envelope moved to and stopped at a position completely inside the transport mechanism with the gate returned to closed position and the gate rear end barrier plate raised to unblocking position and the movable lower platen sprung throughout its length away from the fixed upper platen by the thicker portion of the envelope.

Thus, platen 41 is normally held in the position shown in FIG. 3 by the springs 51 and 53 until movable platen 41 is subjected to a separating force, described below. At such time the entry end of platen 41 moves downward and away from the fixed platen 18 and in the direction of belt travel indicated by the arrow 35. Such movement is directed by movement of the pins 45 and 46 in side plate angular slots 49, against the biasing action of one or both of springs 51 and 53 to positions such as shown in FIGS. 17 to 19.

Figure 20:
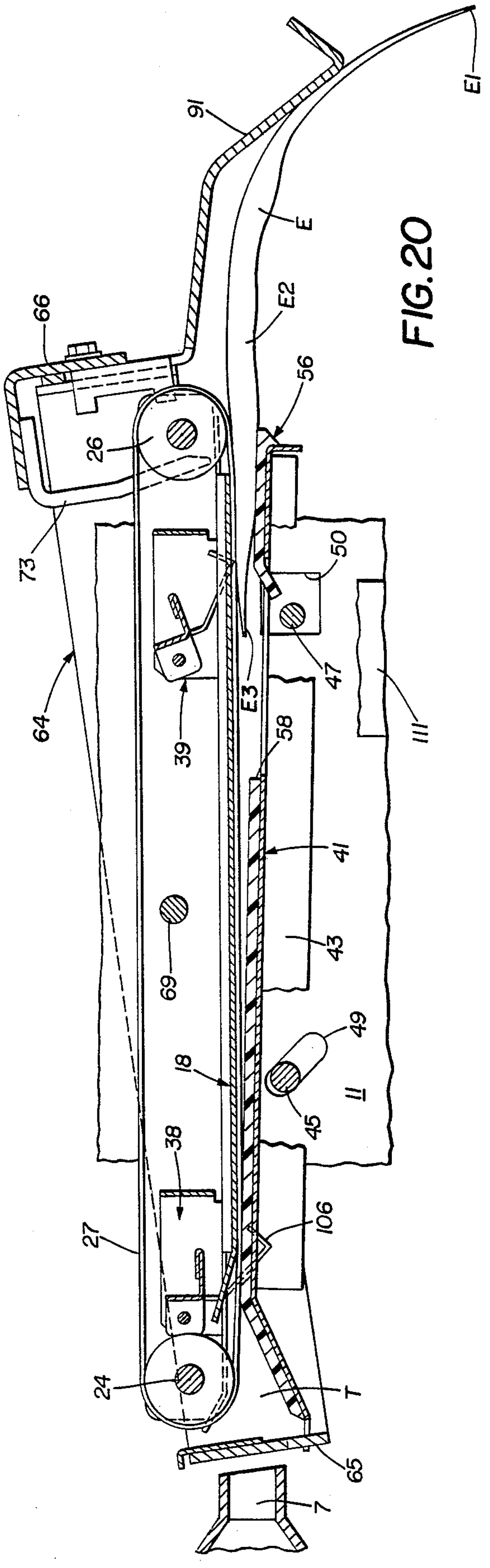
FIG. 20 is a view similar to FIGS. 16 through 19 showing the envelope being discharged from the transport mechanism and the entry end portion of the movable lower platen returned to engage the belt and fixed upper platen.

As a separating force is applied to the platens 18 and 41 in regions of the discharge end of the transport assembly 9, the discharge end of the lower platen 41 is moved away from the upper platen 18 against the biasing action of one or both of springs 51 and 53. During such movement the pins 47 and 48 move to various locations within the side plate square openings 50 as shown in FIGS. 19 and 20.

Figure 5:
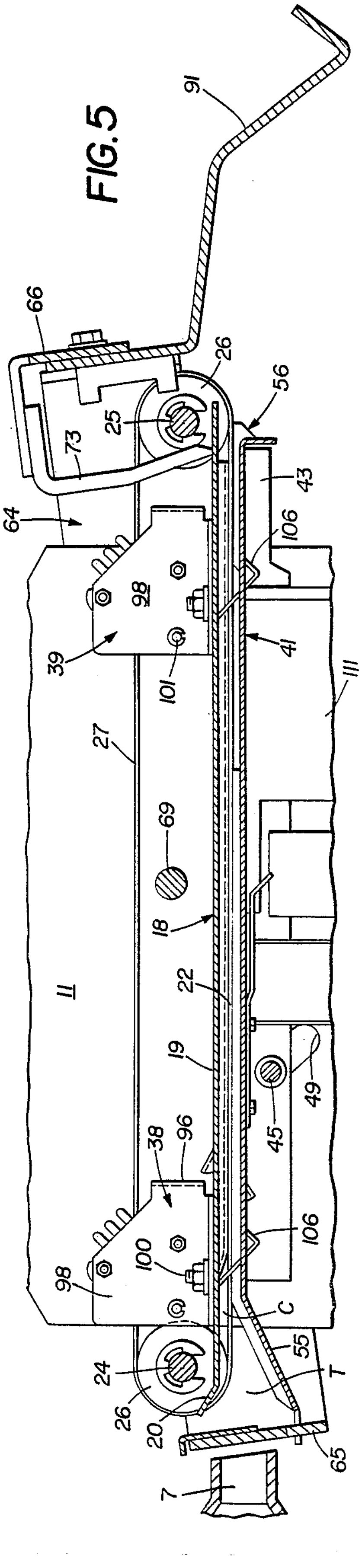
FIG. 5 is a fragmentary section, somewhat diagrammatic, taken on the line 5—5, FIG. 2 and showing the transport belt and platen assembly and a fragmentary portion of the depository fascia envelope entry slot adjacent the entry end of the transport belt and platen assembly.

The movable lower platen has an angularly downwardly directed ramp 55 at its entry end located below the entry end belt roll 26 and the upper platen ramp 40 as shown in FIG. 5 to provide a funnellike throat opening area T between the entry ends of platens 18 and 41 for receiving the insertion into the transport mechanism of envelopes to be deposited as described below.

A central longitudinally extending ribbed body is provided projecting upward from the flat top 42 and ramp 55 of the movable platen 41 generally indicated at 56. This ribbed body 56 is interrupted at 57 (FIG. 9) at the ends of an opening 58 provided in the flat top 42 adjacent the discharge end of the movable platen 41.

Figure 11:
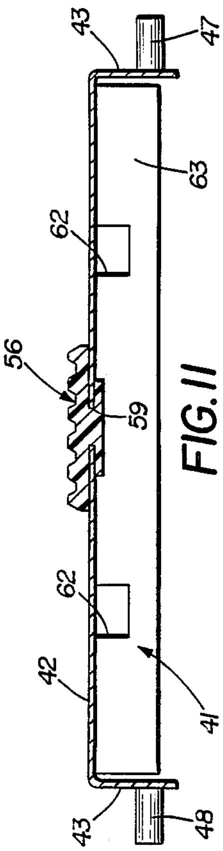
FIG. 11 is a sectional view looking in the direction of the arrows 11—11, FIG. 9, showing the construction of the movable lower platen component.

Central longitudinally extending slot portions 59 are formed in the top wall 42 of platen 41 through which the ribbed body 56 extends as the body is molded of low-friction plastic material to integrally unite the body 56 and platen 41. During molding, the body 56 is formed to be H-shaped in cross section (FIG. 11). The narrow tops of the ribs of ribbed body 56 support envelopes conveyed through the transport assembly 9 by the belt 27 with minimum surface contact between such envelopes and the ribs as an envelope slides along the slippery ribbed surfaces of the low-friction plastic material.

When the platens 18 and 41 are assembled in normal engaged position for operation as shown in FIGS. 3,4 and 5, there are longitudinal recesses C present between the platens 18 and 41 at both sides of the offset portion 22. The belt 27 and the ribbed body 56 provide substantial clearance between the platens (FIG. 4). The clearance recesses C minimize contact with the platens 18 and 41 in the clearance zones by an envelope being conveyed. Such clearance, as well as the minimum surface contact of an envelope being conveyed with the slippery tops of the ribs of the ribbed body 56, minimize drag between the envelope and ribbed body as an envelope is conveyed by the belt 27 through the transport mechanism.

The top wall 42 of platen 41 has a pair of narrow slots 60 formed therein at either side of the ribbed body 56 adjacent the ramp 55 at the entry end of platen 41. A similar pair of slots 61 is formed in the flat top 42 of platen 41 extending to the discharge end of the platen terminating in notches 62 in the downturned discharge end flange 63 of platen 41 for purposes to be later described.

Figure 13:
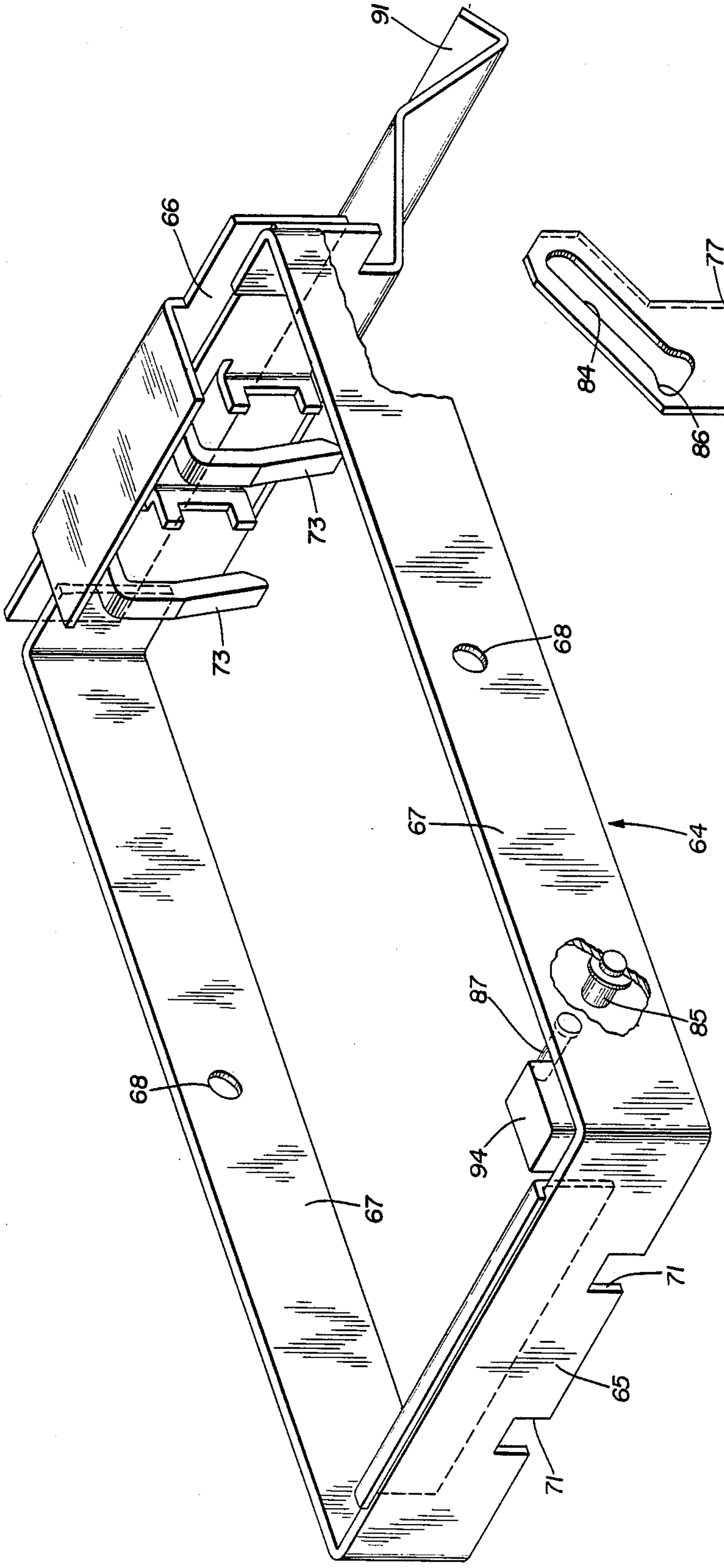
FIG. 13 is a perspective view of the gate component of the transport mechanism detached from the mechanism shown in FIGS. 2, 3 and 4.

The transport assembly 9 includes another component, namely a gate member, generally indicated at 64, which is generally rectangular in shape and is best shown in FIG. 13. The gate member 64 has an entry end barrier plate 65, a discharge end barrier plate 66 and longitudinal side members 67 integrally connected together to form the rectangular shape.

The gate member 64 is pivotally mounted at 68 substantially centrally of its length on a pivot shaft 69 mounted on and extending through the mechanism side plates 11 to encompass the transport belt and platen assembly 9. Pivot shaft 69 extends between the side plates 11 above the upper platen 18 and below the top reach of the belt 27 (FIGS. 2 and 5).

There is a spacer sleeve 70 on one end of pivot shaft 69 extending between the outside surface of side plate 11 and the inside surface of one longitudinal side member 67 of gate member 64 to maintain the gate member 64 in proper longitudinal alignment with the remaining components of the transport mechanism.

Notches 71 are formed in the lower edge of gate member entry end barrier plate 65 (FIG. 13) for receiving ears 72 projecting from the free edge of lower platen ramp 55 (FIG. 9), to form an interfitting connection (FIG. 5) between the entry ends of the gate member 64 and lower platen 41. This interfitting connection securely encloses the throat area T between the belt 27 and ramp 55 against attack measures that may be attempted through the envelope entry slot 7 by someone trying to remove deposited envelopes when the equipment is in the normal closed position shown in FIG. 5.

The gate member discharge end barrier plate 66 (FIG. 13) has spaced downwardly directed fingers 73 mounted thereon inside of the barrier plate. The fingers 73 enter and are engaged within the slots 61 (FIG. 9) at the discharge end of the lower platen 41 immediately inside the downturned flange 63 at the discharge end of platen 41 as shown in FIGS. 17 and 18 when the gate member 64 is in the open position receiving, accepting and conveying envelopes to be deposited.

In this position, the platen 41, flange 63, slots 61 and fingers 73 form an interfitting connection between the discharge ends of the gate member 64 and lower platen 41. At this time the gate member discharge end barrier plate 66 is immediately behind the discharge end of the belt conveyor with the fingers 73 blocking passage along the path of travel between the platens 18 and 41 as shown in FIGS. 17 and 18.

Security against through-access along the path of travel between the platens 18 and 41 thus is provided against fishing of deposited envelopes from the deposit unit 1. That is to say, the new transport mechanism prevents or blocks through-access at all times between the platens along the transport path of travel by one or the other of the barrier plates regardless of the position of the gate member 64.

Figure 14:
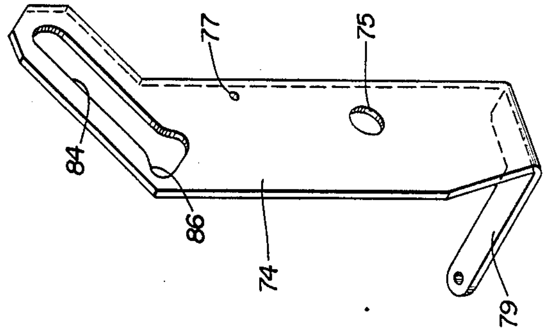
FIG. 14 is perspective view of the gate actuator detached from the transport mechanism shown in FIGS. 2, 3 and 4.

Positioning the gate member 64 in open or closed position, and locking the gate member 64 in closed position are controlled by gate actuator 74 illustrated in FIG. 14. The actuator 74 is shown in gate closed and locked normal position in FIG. 3, and in gate open position in FIG. 7. The gate actuator 74 is pivotally mounted at 75 intermediate its ends on one of the mechanism side plates 11 and is biased to normal gate closed position (FIG. 3) by spring 76 one end of which is connected to the actuator at 77, and the other end of spring 76 is connected to the side plate at 78.

The lower end of actuator 74 is provided with a foot 79. Foot 79 projects angularly inward through a slot 80. The slot 80 is located at the lower corner of the side plate 11 and extends inward from the entry end edge 16 of the side plate. The projecting end of the foot 79 is connected by a spring 81 with the armature 82 of a solenoid 83. The solenoid is de-energized when the actuator 74 and gate member 64 are in normal closed position (FIG. 3). When the solenoid 83 is energized (FIG. 7) it draws gate actuator 74 against the tension of the spring 71 to a pivoted position which moves the gate member 64 to open position.

This movement of the gate actuator 74 to control the described gate member movement is accomplished by the cam slot 84 connection of the actuator with a pin 85 extending inward from the gate longitudinal side member 67 (FIG. 13).

The elongated slot 84 has an enlarged lock-notch 86 at its lower end in which the pin 85 is engaged when actuator 74 is biased to normal closed position by spring 76 as shown in FIG. 3. In this position the lock-notch 86, engaging pin 85, locks the gate member 64 in closed position. When the gate actuator 74 is moved by energizing the solenoid 83, the cam slot lock-notch 86 releases the pin 85 and as actuator 74 pivots counterclockwise on pivot 75, the cam slot traversing the pin 85 moves the pin to the upper end of the cam slot, raising the entry end of the gate member 64 to the open position of the gate member shown in FIG. 7.

Figure 7:
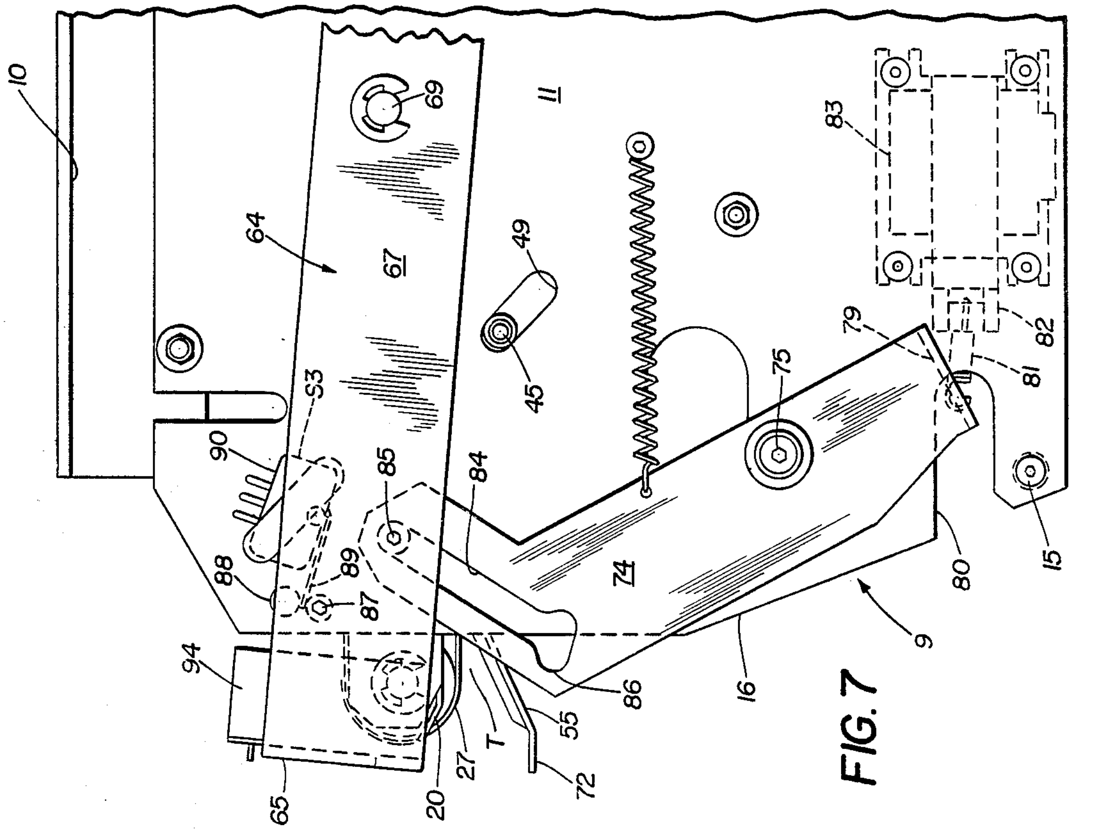
FIG. 7 is a view similar to a portion of FIG. 3 showing a portion of the gate moved to open position by the gate actuator and solenoid.

Movement of the gate member 64 toward open position by engagement of pin 85 with the upper end of the actuating cam slot 84 also is stopped coincidentally by engagement of pin 87 on gate side member 67 (FIG. 13) with cushioned stop pin 88 mounted on the side plate 11 at its upper corner adjacent entry end edge 16 (FIG. 7). Just before pin 87 engages and is stopped by stop pin 88, pin 87 engages and trips blade 89 of switch 90 mounted on side plates 11 (FIG. 3).

Figure 15:
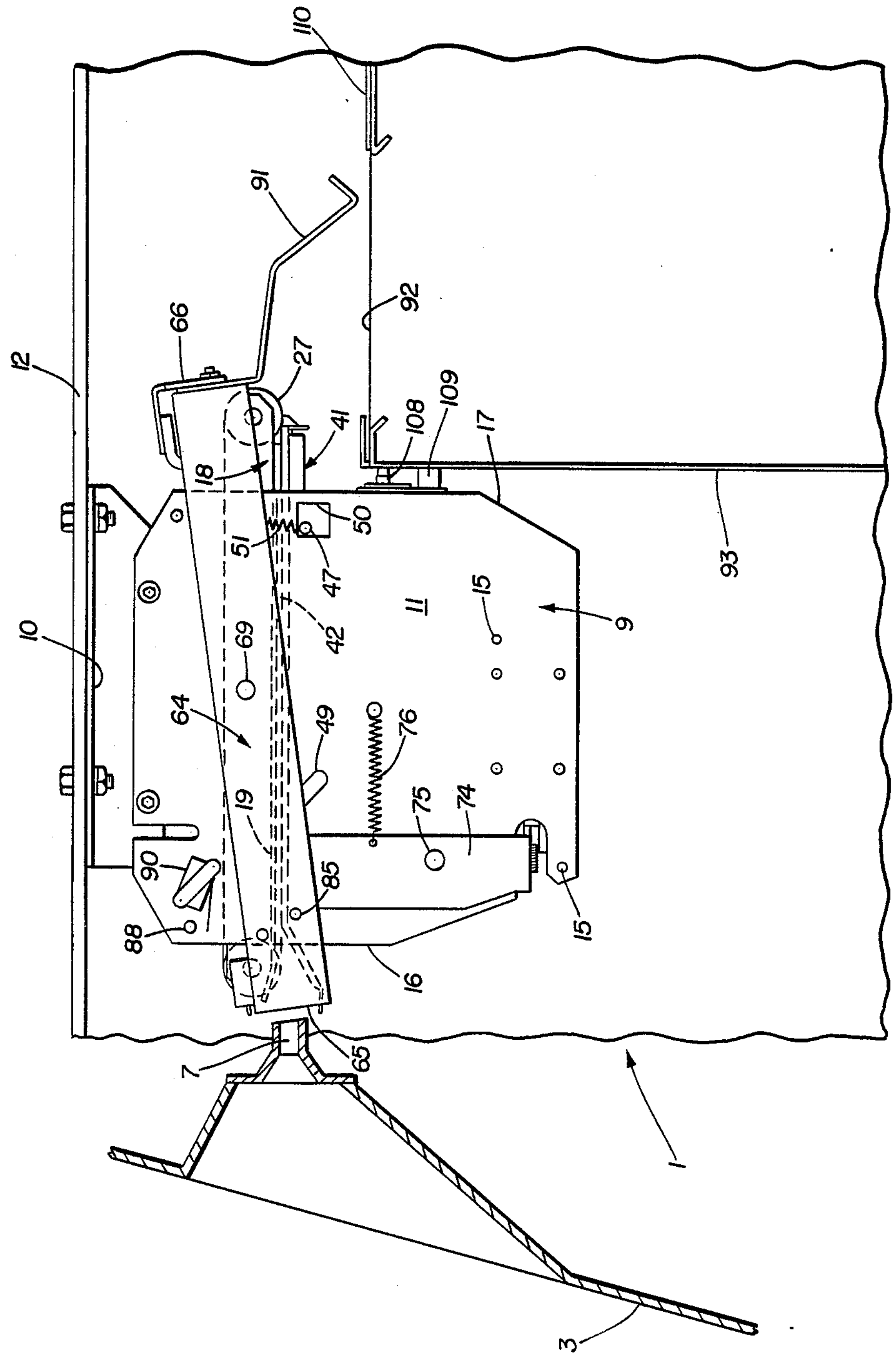
FIG. 15 is a schematic view illustrating the new transport mechanism installed in an envelope depository in position to accept an envelope inserted into the depository through an entry slot in the fascia of the depository.

Gate discharge end barrier plate 66 which may have several layers has a probe extension 91 which, as shown in U.S. Pat. No. 4,312,277, incorporated by reference herein, may enter in opening 92 in container 93 into which deposited envelopes are discharged, to determine whether the container is full or can accept an envelope intended to be deposited (FIG. 15). If container 93 is full, probe 91 will strike the accumulated envelopes in the container preventing gate member 64 from being moved to open position, Thus, when the gate member 64 cannot be moved to open position, an envelope cannot be entered into the transport mechanism 9 of deposit unit 1.

Preferably a metal counterweight block 94 is mounted at an entry end corner of the rectangular gate member 64 to counterbalance the probe extension 91 projecting from the gate member discharge end barrier plate 66.

Envelope position sensor devices indicated at 38 and 39 are mounted on the fixed platen bottom wall 19 adjacent the entry and discharge ends, respectively, of the fixed platen 18 (FIGS. 2, 8, 10 and 12). These sensor assemblies are identical so only one is described in detail. The sensor assembly 38, for example, includes a cross member 96, end flanges 97 and 98 and an outturned foot 99 at the lower edge of each flange 97 and 98. The feet 99 are bolted at 100 to the bottom wall 19 of platen 18. A switch 95 is mounted at end flange 98. For clarity, the upper portion of end flange 98 at the platen discharge end is broken away.

A pivot shaft 101 is journaled at its ends in and between end flanges 97 and 98 of each sensor 38 and 39. A switch actuator 102 has a body portion 103, which terminates in flanges 104 that are pivotally mounted on shaft 101. An ear 105 projects upward from one end of the body portion 103 adjacent switch 95. Angular contact legs 106 on entry sensor 38 hang downward through lower platen slots 60. Similarly, contact legs 106 on discharge sensor 39 hang downward through lower platen slots 61.

The contact legs 106 of each sensor 38 and 39 are biased to such positions hanging downward through lower platen slots 60 and 61, respectively, by the weight of flange 107 extending in the direction of belt travel indicated by arrow 35 tending to rotate the body portions 103 in clockwise directions on pivot shafts 101, respectively, viewing FIG. 8.

Thus, the contact legs 106 extend downward through the path of travel of an envelope between the platens 18 and 41. When an envelope is conveyed by the belt 27, the hanging legs are engaged by the leading edge of the envelope to raise the legs and when the envelope trailing edge passes the contact legs 106 they again drop through their respective lower platen slots.

Figure 12:
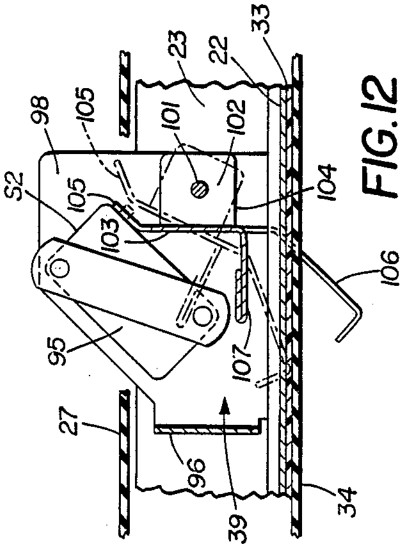
FIG. 12 is a fragmentary sectional view looking in the direction of the arrows 12—12, FIG. 10, showing one of the envelope movement sensors mounted on the fixed upper platen.

When the contact legs 106 are hanging through their respective lower platen slots, the ear 105 of the corresponding sensor body portion 103 engages a blade of the switch 95 of such sensor to actuate the switch to one mode of operation and when the contact legs are raised by a moving envelope the ear 105 releases the switch blade to actuate the switch to another mode of operation, as shown in dot-dash lines in FIG. 12. The switch 95 of entry sensor 38 is designated S1 in FIG. 2; and the switch 95 in discharge sensor 39 is designated S2 in FIGS. 2, 10 and 12.

The new envelope transport mechanism 9 is shown diagrammatically in FIG. 15 assembled in a depository unit 1 between the fascia 3 and container 93 into which envelopes being deposited are discharged through container opening 92. The fascia 3 and container 93 in unit 1 may have the construction shown in U.S. Pat. No. 4,312,777 with the transport mechanism of said patent replaced by the new transport mechanism 9 of the invention.

One fundamental difference in the new transport mechanism 9 from the transport mechanism in said patent is that the fixed upper platen 18 and belt conveyor thereon are substantially shorter and simpler in design than the belt conveyor and floating upper platen of the patent. The fixed upper platen 18 and belt conveyor thereon are generally located lengthwise within the confines of the rectangular gate member 64 that encompasses the conveyor.

Further, the probe 91 extends beyond the belt conveyor and outward from the discharge end of the gate member 64, rather than beneath the belt conveyor in the patent which requires a complicated probe construction and mounting thereof to enable the probe to clear the belt for sensing the status of envelopes in the container.

The transport mechanism 9 is provided with a switch actuator 108 and a container locator stop member 109 (FIGS. 3 and 15). Container 93 is removable from the depository unit 1. However, when the container 93 is installed in the unit 1, it is moved to the position shown in FIG. 15 and engages the stop member 109 and moves the switch actuator 108 to actuate its mode indicating that the container 93 is in proper location for opening the closure lid 110 for the container opening 92.

Figure 6:
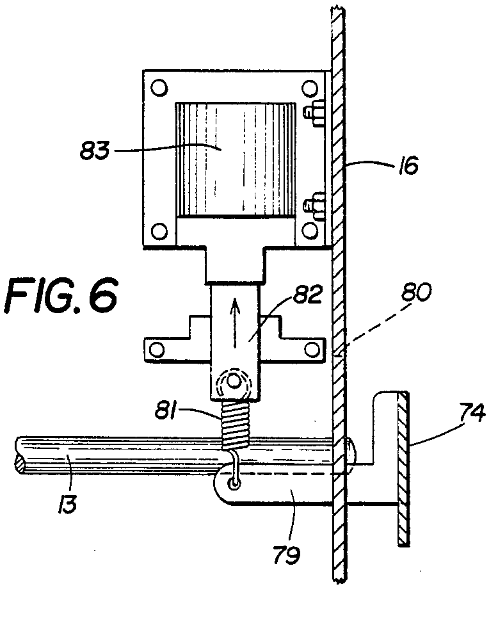
FIG. 6 is a fragmentary sectional view taken on the line 6—6, FIG. 4, showing the solenoid which moves the gate actuator to in turn move the gate to open position to enable the transport mechanism to accept an envelope for deposit.

Another feature of simplicity of construction and reliability of operation of the new transport mechanism 9 relates to the spring connection between the solenoid armature 82 and the gate actuator 74 (FIG. 6). This spring connection enables the solenoid armature 82 to bottom when the solenoid is de-energized and, thus, avoids humming, etc., which can occur with an AC solenoid when the armature does not bottom.

Another simplicity, and reliable feature of the new transport mechanism involves the overhanging relationship of ramp 40 at the entry end 20 of the fixed upper platen 18 and the adjacent belt and entry end roll 26 over the downwardly directed ramp 55 of the lower platen 41. This overhang provides the funnellike zone or gap between the transport mechanism and entry slot 7 when the gate member 64 is in open position as shown, for example, in FIG. 17.

Thus, as an envelope is entered through the slot 7 toward the transport, the funnellike gap directs the leading end of the envelope to contact the moving belt 27 which exerts an inward pull on the envelope, whereupon envelope thicknesses engaging the movable lower platen cause the platen to separate while maintaining the belt conveying pressure on the envelope.

The belt preferably is formed of a rubber-fabric composition to provide maximum gripping characteristics for envelope conveyance. The plastic belt backing strip 33 engaged by and supporting the belt preferably is formed of ultrahigh molecular weight polyethylene to provide a slick, slippery surface along which the belt slides.

Similarly, the plastic material molded to form the ribbed body 56 preferably has a nylon/Teflon/carbon composition to provide slippery surfaces, the carbon rendering the body conductive to convey static electricity which may accumulate away from the transport components.

The ribbed slippery surface construction of a plastic body 56 reduces the area of contact along which an envelope slides and thus provides minimum resistance to wet envelopes which may be deposited and reduces the power requirements of the drive motor.

The central offset portion 22 in the upper platen 18 is preferably one-eighth inch high by one and one-eighth inch wide under the transport belt 27 to provide part of the clearance C between the upper and lower platens. The remainder of the clearance C is provided by the projection of the low-friction glide surface of the ribbed body 56 one-eighth inch above the surface of the lower platen 41. The total clearance space, thus, is one-quarter inch in thickness between the platens.

The angularity of the angular slots 49 in the side plates 11 to guide separation movement of the lower platen 41 as the platen accepts envelopes of varying thickness is preferably 45°. The lower platen 41 may have changing angularity with respect to the fixed upper platen 18 during seesawlike movement as a thick portion of an envelope is conveyed between the platens. Such separation preferably may have a three-eighths inch value at any place along the platens as envelopes of varying thicknesses are conveyed along the path of travel between the platens.

One of the important aspects of the invention involves the angular slots 49. The angularity of the slots 49 provide the additional advantage of reducing frictional drag on the envelope and reducing power requirements for the drive motor. This results because the movement of the envelope by the belt into the area between the platens results in a force being applied to the lower platen at an angle which approximates the angle of the slots. As the angle of the applied force and the angle of the slots coincide, the pins on the lower platen exert little or no force perpendicular to the slot wall. As the normal force between the pin and slot wall is minimized, frictional resistance to the movement of the lower platen is reduced. Therefore, the amount of force which must be applied by the envelope to the lower platen to cause it to open and provide access for the envelope is reduced. As the force which must be applied by the envelope is derived from the belt which is driven by the drive motor, the power requirements for the drive motor are reduced.

The probe extension 91 has been described as a means of determining whether the container 93 is full and cannot accept deposit of an additional envelope. However, the probe extension 91 also assists in deflecting envelopes being discharged into the container 93 as shown in FIG. 20, and also aids in stuffing deposited envelopes loosely stacked in the container 93 to compact the stack to completely fill the container.

The opening 58 in the lower platen is provided so that a printer 111 of usual construction located below the lower platen 41 may be actuated to print an identification number on an envelope through the opening 58 when envelope travel is stopped momentarily for that purpose.

OPERATION

A typical operation of the depositing cycle for depositing an envelope in the use of the new transport mechanism incorporating the concepts of the invention is illustrated somewhat diagrammatically in FIGS. 16 to 20.

A customer desiring to deposit an envelope inserts his magnetic striped identification card of known type into the card entry slot 6. At this time the transport mechanism components are at rest (FIG. 16) with the gate member 64 in closed position with the entry barrier 65 closed and the discharge barrier 66 open and the drive motor 32 off. The customer, after identification verification of his credit or identification card, then, in accordance with display panel instructions, presses one of the keys at keyboard 5 to indicate that an envelope is to be deposited.

The deposit unit 1 then is energized to energized the unit programmed actuating circuitry, to supply power for the conveyor drive motor 32 and to supply power for the solenoid 83.

The programmed circuitry then energizes the solenoid 83 which moves the gate member 64 toward open position. If the probe extension 91 encounters a full container, the gate pin 87 does not contact blade 89 of switch 90 is not actuated. Switch 90 also is indicated as switch S3 in FIGS. 3 and 7. In this event and mode, switch S3 indicates a container-full status in the control circuitry, the solenoid is de-energized and the gate member 64 returns to closed position.

However, if switch S3 is actuated as gate member 64 reaches open position as shown in FIG. 17, the control circuitry knows that a deposit envelope can be accepted and the belt drive motor 32 is energized. It is now possible for the customer to insert an envelope through the fascia entry slot 7 into the funnellike gap below the moving belt 27 and the lower platen ramp 55. The belt pulls the envelope, indicated at E, between the platens and the leading end El of envelope E moves beyond the entry switch S1 and raises the switch contact legs 106, whereupon switch S1 opens by movement of ear 105 away from the switch, releasing its switch blade.

During such envelope movement, platens 18 and 41 are spread apart and lower platen control pins 45 move downward in angular slots 49 to the position shown in FIG. 17 thereby moving lower platen 41 in the direction of travel of the envelope with minimum resistance or drag to envelope movement.

Continued movement of the envelope E between the platens 18 and 41 is illustrated in FIG. 18. The envelope has a thicker section E2 which has spread the platens 18 and 41 further apart, pins 45 moving further downward in angular slot 49, thereby moving lower platen 41 further to the right viewing FIG. 18 in the direction of envelope travel.

The envelope E is shown in FIG. 18 approaching the hanging contact legs 106 of switch S2 and the envelope trailing end E3 has almost completely entered the transport mechanism. The discharge end of lower platen 41, however, is still tipped upward toward the discharge end of the fixed upper platen 18, pin 47 having moved to the upper righthand corner of square opening 50.

The envelope is driven further until it actuates switch S2 (FIG. 19) which switch change of mode causes the following events to happen. Gate member 64 moves to closed position as shown which in turn raises discharge gate barrier plate 66 to open position. Belt drive motor 32 is stopped and a serial number is stamped or printed upon the underside of the envelope through opening 58 by printer 111.

The envelope then is driven in its path of travel by the drive of belt 27 for a short distance, say about one inch, and the serial number is restamped on the underside of the envelope to be sure that at least one of the serial numbers stamped on the envelope is legible on an irregular surface of the envelope because of the bulk therein, for example of coins.

Then the drive motor 32 continues to drive the belt and to convey the envelope to the position shown in FIG. 20 almost out of the transport mechanism. Meanwhile, the entry end of the lower platen 41 has tilted, being pressed upward against the belt 27 and upper fixed platen 18 to the position shown in FIG. 20.

The motor drive of the belt continues for a short time period so that the envelope E is discharged from the transport mechanism and drops into the container 93 (FIG. 15).

When the trailing end E3 passes under switch S2 (FIG. 20) the hanging legs 106 of switch S2 are released to drop through the slots 61 in the discharge end of the movable lower platen 41 changing the actuated mode of switch 2 which, after a short time lag, de-energizes and stops the drive motor 32 completing a cycle of operation.

The equipment is now ready, unless the container 93 is full, to accept the deposit of another envelope by a customer.

Meanwhile, other printer mechanism in the unit 1 of known construction but not shown may deliver a receipt to the customer-depositor for the envelope E just deposited through the receipt slot 8.

At this time, the envelope E having been discharged from the transport mechanism, the movable lower platen returns to the position shown in FIG. 16 pressed against the fixed upper platen 18.

Various aspects of and new advantageous features of the new transport mechanism have been discussed in detail above. An important and fundamental aspect of the new mechanism involves the concept of providing a fixed platen mounted in the mechanism frame in combination with an adjacent movable platen which is biased toward the fixed platen but is sprung away from the fixed platen angularly in the direction of the path of travel of an envelope being conveyed, by the envelope pressure on the movable platen which spreads the platens apart to the degree necessary to accommodate envelopes of different thickness and which may contain coin.

Accordingly, the new envelope depository transport mechanism economically and reliably accepts bank deposits of varying thicknesses in envelopes which may be wet and which contain coin, in which the mechanism has a simplified construction and presents lower drag and has less motor torque requirements as compared with prior art banking equipment transport mechanisms heretofore used over which the new concepts are an improvement; and in which the simplified construction and mode of operation achieve the stated objectives, eliminate difficulties present in the operation and use of prior art devices and solve problems and obtain the new results described.

In the forgoing description, certain terms have been used for brevity, clearness and understanding, but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact details shown or described.

Having now described the features, discoveries and principles of the invention, the manner in which the equipment is constructed and operated, and the advantageous, new and useful results obtained; the new and useful structures, devices, elements, arrangements, parts, combinations, operations and relationships are set forth in the appended claims.

We claim:

1. A transport mechanism having entry and discharge ends for transporting envelopes containing banking materials deposited into deposit accepting banking equipment under secure conditions, the mechanism transporting a deposited envelope from the entry end to the discharge end, said mechanism comprising:

a frame;

a fixed platen mounted on said frame;

spaced rolls journaled in fixed positions on said fixed platen;

driving means for driving one of said rolls;

an endless belt trained around the spaced rolls, said belt having a first belt flight movable and in supporting contact with said fixed platen;

a movable platen extending from the entry end to the discharge end;

mounting means for mounting the movable platen on said frame, said mounting means permitting movement of the entire movable platen angularly away from the fixed platen and in the direction of travel of the first belt flight when the belt is driven; and biasing means biasing the movable platen toward the fixed platen to engage the first belt flight;

the deposited envelope engaging the belt at the entry end and being conveyed by the first belt flight between the fixed and movable platens, the deposited envelope moving the movable platen away from the fixed platen to the degree necessary to accommodate the thickness of said envelope.

2. The construction defined in claim 1 wherein the fixed platen comprises an upper platen having a bottom wall extending from an entry end to a discharge end; said bottom wall having a central longitudinal downwardly projecting offset belt supporting portion extending between said entry and said discharge ends, and envelope-clearance recesses disposed laterally of said offset belt supporting portion.

3. The construction defined in claim 2 in which said spaced rolls are journaled, respectively, adjacent the entry and discharge ends of said bottom wall in end portions of said upturned flanges; and in which said belt one flight is supported on low-friction plastic material on said upper platen offset portion.

4. The construction defined in claim 3 in which said low-friction belt supporting plastic material comprises a belt backing strip of ultrahigh molecular weight polyethylene.

5. The construction defined in claim 2 in which said spaced rolls are journaled, respectively, adjacent the entry and discharge ends of said bottom wall; and in which first and second envelope-position sensors are mounted on said bottom wall between said upturned flanges and between the endless belt flights, respectively, adjacent the spaced entry and discharge rolls.

6. The construction defined in claim 5 in which said first and second sensors have first and second switches, respectively, mounted thereon; in which said first and second sensors are provided with switch actuators pivotally mounted on said upper platen; in which said switch actuators are provided with legs hanging through slots formed in said upper platen bottom wall at either side of said offset portion and at the bottom wall entry and discharge ends, and through slots formed in said movable lower platen aligned with said upper platen slots; in which such hanging legs extend through the path of travel between said upper and lower platens and are adapted to be engaged by a leading end of an envelope conveyed along said path of travel to raise said legs out of the path of travel to change the switch status from one mode to another; and in which such hanging legs are adapted to be disengaged by a trailing end of an envelope conveyed along said path of travel to resume hanging through said slots and to change the switch status from one mode to another.

7. The construction defined in claim 1 wherein the movable platen comprises a lower platen having an entry end and a longitudinally disposed discharge end and comprising a top wall having downwardly inclined ramp means formed at said entry end for receiving envelopes, a printer access opening formed intermediate said entry and discharge ends for enabling actuation of printer means located near said opening, ribbed body means projecting upwardly from said top wall and from said ramp means and extending longitudinally between said entry and discharge ends toward said printer access opening, and envelope clearance recesses disposed laterally of said ribbed body means.

8. The construction defined in claim 7 in which said ribbed body means has a series of separate longitudinally extending ribs having spaced narrow envelope-engaging tops; in which said ribbed body is formed of low-friction plastic material slidably supporting an envelope conveyed along the path of travel by the endless belt when driven.

9. The construction defined in claim 8 in which said low-friction plastic material comprises a nylon/Teflon/carbon composition.

10. The construction defined in claim 7 in which the means mounting the lower platen on the frame includes first pin means adjacent the lower platen entry end projecting laterally outwardly from said lower platen downturned flanges engaged in slots formed in frame side plates extending angularly downward in a direction toward the discharge end of said movable platen, and second pin means adjacent the lower platen discharge end projecting laterally outward from said lower platen downturned flanges extending into enlarged openings formed in frame side plates; and in which first and second springs bias said lower platen normally toward said upper platen, said first spring being connected to said first pin means and to a frame side plate adjacent the lower platen entry end, and said second spring being connected to said second pin means and to a frame side plate adjacent the lower platen discharge end.

11. The construction defined in claim 1 in which the transport mechanism frame has two side plates connected together in fixed spaced relation extending between mechanism entry and discharge ends; in which the fixed platen is an upper platen having a bottom wall extending between mechanism entry and discharge ends; in which said bottom wall from entry to discharge end has a central longitudinal downwardly projecting offset belt supporting portion; in which said upper platen is located between said frame side plates and said bottom plate upturned flanges are bolted to said frame side plates to mount the upper platen in fixed position on said frame; in which lateral upper platen bottom wall portions between said offset portions and said upturned flanges form envelope-clearance recesses; in which said movable platen is a lower platen and has a flat top wall extending from mechanism entry to discharge ends; in which said top wall has downturned flanges at its side edges; in which an angular downwardly directed ramp is formed at the entry end of said lower platen; in which an opening is formed in said top wall located laterally centrally of and intermediate the ends of the top wall; in which central longitudinally ribbed body means are mounted on and project upwardly from said top wall and ramp extending from the top wall entry and discharge ends to said opening; in which lateral top wall portions between said ribbed body means and said downturned flanges form envelope clearance recesses beneath said upper platen envelope clearance recesses; in which said means mounting the lower platen movably on said frame locate said lower platen beneath said upper platen with said ribbed body means aligned with said upper platen offset portions and pressed against said endless belt lower flight and with said lower platen ramp located below one of said spaced rolls; and in which a funnellike gap is formed between said ramp and said last mentioned roll to direct an envelope being deposited into engagement with the belt at the entry end of said transport mechanism.

12. The construction defined in claim 11 in which the means mounting the lower platen on the frame includes first pin means adjacent the lower platen entry end projecting laterally outwardly from said lower platen downturned flanges engaged in slots formed in frame side plates extending angularly downward in a direction toward the discharge end of said movable platen, and second pin means adjacent the lower platen discharge end projecting laterally outward from said lower platen downturned flanges extending into enlarged openings formed in frame side plates; and in which first and second springs bias said lower platen normally toward said upper platen, said first spring being connected to said first pin means and to a frame side plate adjacent the lower platen entry end, and said second spring being connected to said second pin means and to a frame side plate adjacent the lower plate discharge end.

13. The construction defined in claim 12 including a rectangular gate member having entry and discharge end barrier means encompassing said frame side plates and the upper fixed and lower movable platens mounted within the space between said side plates; in which said gate member is pivotally mounted intermediate its entry and discharge barrier means exteriorly on side frame side plates for movement between transport closed and open positions, in which said gate member is biased normally to closed position; in which said entry end barrier means interengages the entry end of the lower platen when said gate member is in closed position blocking access to said transport mechanism belt; in which said discharge end barrier means interengages the discharge end of the lower platen when said gate member is in open position blocking discharge of envelopes from said transport mechanism belt.

14. The construction defined in claim 13 including actuator means for moving the gate member to open position; in which said actuator means has a solenoid the armature of which is operatively connected with the gate member by a spring.

15. The construction defined in claim 14 in which spring means normally bias the gate member to closed position; in which the spring means includes at least two springs at least one of which is connected to a frame side plate and to said entry end barrier means, and at least another of which is connected to the other frame side plate and to the discharge end barrier means.

16. The construction defined in claim 1 and further including a gate member and mounting means for mounting said gate member on the frame for pivotal movement between envelope transport closed and open positions, said gate member having entry and discharge end barrier means one of which blocks through passage of an envelope along the mechanism path of travel when the gate member is in either closed or open positions, said barrier means being located at positions beyond the ends of the fixed and movable platens and beyond the spaced rolls around which the endless belt is trained, interfitting means connecting one end of the movable platen and one of the gate member barrier means when the gate member is in either closed or open position, said movable platen and said one of the barrier means having a slot component, said interfitting means comprising a projection component engaged in said slot for preventing relative movement between the movable platen and the barrier means.

17. The construction according to claim 16 wherein the fixed platen comprises an upper platen and the movable platen comprises a lower platen, said frame having spaced side plates and a pivot shaft mounted on and projecting externally of said side plates, the upper and lower platens being located between said spaced frame side plates; wherein the gate member comprises an integral rectangular frame having longitudinal side members and entry and discharge end barrier means plates, said gate side mounting means comprising openings in said gate side members journaled on the ends of said pivot shaft, said pivot shaft extending through the side plates above the upper platen and between the belt flights, the gate member encompassing the endless belt and upper and lower plates, and wherein said gate member further includes biasing means for biasing the gate member to the closed position and actuator means for moving the gate member to open position, said actuator means including a solenoid having an armature, an actuator lever pivotally mounted intermediate its ends on one of the mechanism side plates and having pin and slot connection means at one end with said gate member, and a spring connecting said armature to the other end of said actuator lever.

18. The construction defined in claim 17 in which the means normally biasing the gate lever to closed position includes a first spring connected to one end of the gate member and to one of the frame side plates, and a second spring connected to the other end of the gate member and to the other frame side plate; whereby when the solenoid is de-energized said first and second springs bias the gate member to normal closed position to disable the mechanism from accepting an envelope for deposit.

19. A transport mechanism having entry and discharge ends for transporting envelopes containing banking materials deposited into deposit accepting banking equipment under secure conditions, the mechanism transporting a deposited envelope from the entry end to the discharge end, said mechanism comprising:

- a frame;
- a fixed platen mounted on said frame;
- a movable belt flight movable and in supporting contact with said fixed platen;
- moving means for moving said movable belt flight;
- a movable platen extending from the entry end to the discharge end;
- mounting means for mounting the movable platen on said frame, said mounting means enabling movement of the entire movable platen angularly away from the fixed platen and in the direction of movement of said movable belt flight; and
- biasing means biasing the movable platen normally toward the fixed platen;
- the deposited envelope engaging the belt flight at the entry end and being conveyed with the belt flight between the fixed and movable platens, the deposited envelope moving the movable platen away from the fixed platen to the degree necessary to accommodate the thickness of said envelope.

* * * * *